(12) United States Patent
Jin (10) Patent No.: US 6,366,484 B1
(45) Date of Patent: Apr. 2, 2002

(54) CROSS CURRENT SENSING IN POWER CONVERSION

(75) Inventor: Xiao Ping Jin, Santa Ana, CA (US)

(73) Assignee: Broadband Telcom Power, Inc., Santa Ana, CA (US)

(*) Notice: Subject to any disclaimer, the term of this patent is extended or adjusted under 35 U.S.C. 154(b) by 0 days.

(21) Appl. No.: 09/972,539

(22) Filed: Oct. 8, 2001

(51) Int. Cl.[7] .............................. H02M 3/24; G05F 5/00
(52) U.S. Cl. ........................... 363/95; 363/16; 323/299
(58) Field of Search ......................... 363/16, 17, 20, 363/24, 95, 97, 98, 131, 132, 133; 323/299, 300, 301, 302

(56) References Cited

U.S. PATENT DOCUMENTS

| 4,717,994 A | * | 1/1988 | Diaz et al. ..................... 363/17 |
| 4,794,507 A | * | 12/1988 | Cavigelli ................ 363/300 X |
| 5,036,450 A | * | 7/1991 | Kelleher, Jr. et al. ... 323/299 X |

\* cited by examiner

Primary Examiner—Jessica Han
(74) Attorney, Agent, or Firm—Kam T. Tam (57) ABSTRACT

A power conversion arrangement includes a transformer disposed between an input circuit and an output circuit. The transformer has primary and secondary windings coupled to the input and output circuits, respectively. Current passing through the input circuit is sensed and detected by a detecting circuit which generates a signal proportional in magnitude to the output current sourcing out of the output circuit.

22 Claims, 8 Drawing Sheets

CROSS CURRENT SENSING IN POWER CONVERSION

BACKGROUND OF THE INVENTION

1. Field of the Invention

The present invention relates generally to electrical power conversion, and more particularly, to sensing and monitoring of electrical power in a DC-to-DC switching-mode power converter.

2. Description of the Related Art

Figure 1:
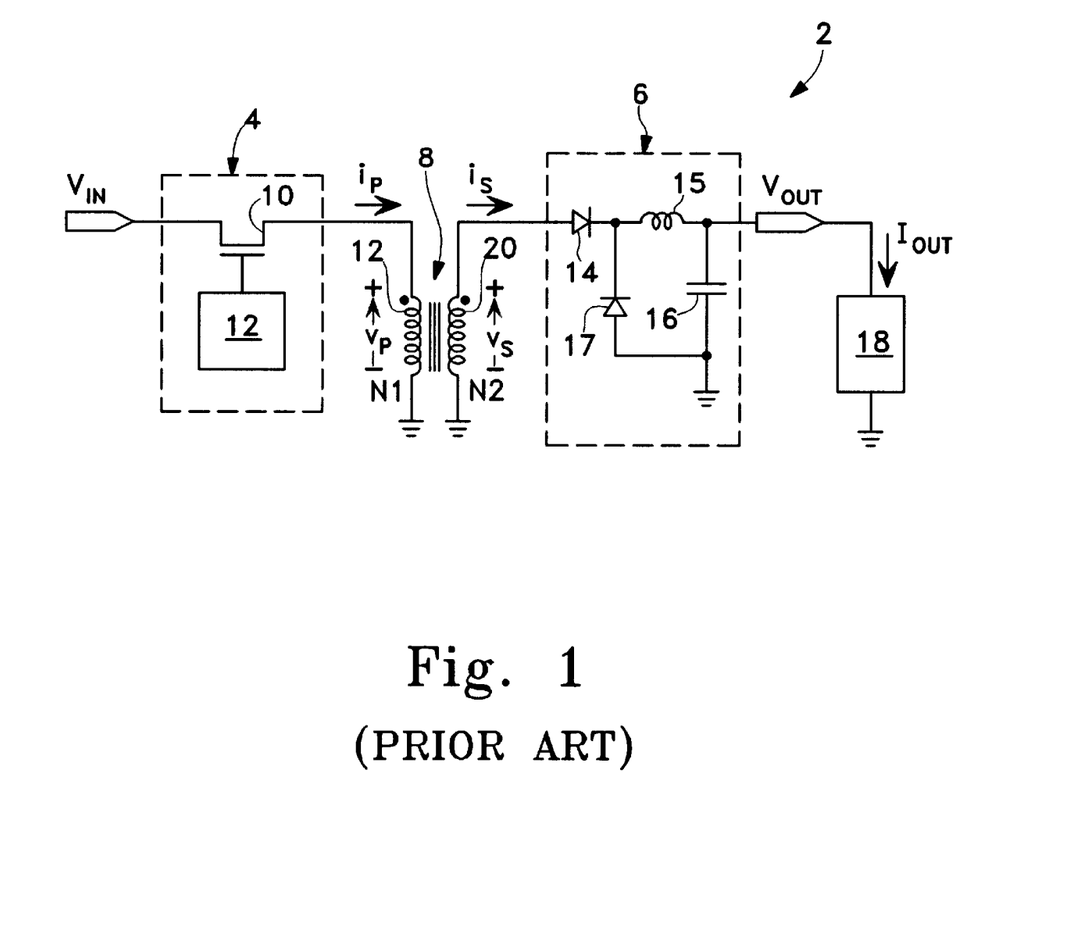
FIG. 1 is a schematic drawing of a known DC-to-DC power converter.

To convert one DC (Direct Current) level to another, a DC-to-DC switching-mode converter is commonly employed to perform the task. FIG. 1 shows a conventional DC-to-DC switching-mode converter signified by the reference numeral 2. The converter 2 has an input circuit 4 and an output circuit 6 separated by a transformer 8. The input circuit 4 includes a switch 10 controlled by a control circuit 12. One terminal of the switch 10 is tied to the primary winding 12 of the transformer 8. The other terminal of the switch 10 is connected to the DC input $V_{IN}$. The output circuit 6 includes an inductor 15 and a capacitor 16 connected in series. The common connection of the inductor 15 and the capacitor 16 drives a load 18. The primary and secondary windings 12 and 20 of the transformer 8 have N1 and N2 winding turns, respectively. Disposed between the secondary winding 20 of the transformer 8 and the inductor 15 is a diode 14. Further, connected across the inductor 15 and the capacitor 16 combination is another diode 17.

During operation, an input DC voltage $V_{IN}$ is supplied to the one terminal of the switch 10. The control circuit 12 generates a periodic output which in essence periodically turns on and off the switch 10. As a consequence, a time-varying current $i_P$ with periodic current pulses flows through the primary winding 12 of the transformer 8. In this specification, the lower case alphabets are used to designate parameters that vary with time. Since the primary and secondary windings 12 and 20 are inductively coupled together, a secondary current $i_S$ is thereby induced in the secondary winding 20. The secondary current $i_S$ passes through the diode 14 which admits only positive current cycles but blocks away any negative counterparts. Since both the inductor 15 and the capacitor 16 respectively assume high inductive and capacitive values, they cooperatively contribute to a slow decaying time-constant. The secondary current $i_S$ with only positive current cycles, after passing through the diode 14, charges and decays sluggishly through the inductor 15 and the capacitor 16. The installation of the diode 17 provides a free-wheel current path when the switch 10 is turned off. As a consequence, a DC voltage level is basically maintained across the capacitor 16. The DC voltage level is utilized as the DC output voltage $V_{OUT}$ driving the load 18. Depending on the impedance of the load 18, a DC current $I_{OUT}$ is established passing through the load 18, in accordance with Ohm's law.

In practice, the load current $I_{OUT}$ needs to be monitored. Insufficient current flowing through the load 18 may render the load 18 inoperative or malfunctional. On the other hand, excessive current $I_{OUT}$ feeding the load 18 may damage the load 18 and also the power converter 2. Different applications require different current monitoring schemes. For example, in some applications in which the load 18 may require over current protection and thus the upper limit of the output current $I_{OUT}$ must be detected and maintained. As another example, in a shared-load arrangement, the common current $I_{OUT}$ driving the shared load 18 needs also be ascertained for proper load current allocation. Furthermore, in usages where the instantaneous power needs to be known, the instantaneous value of the output current $I_{OUT}$ must also be instantaneously detected and reported.

Heretofore, monitoring of the output current $I_{OUT}$ has mostly been conducted on the secondary side of the transformer 8 by directly measuring the current path through the load 18. A common approach is to place a shunt resistor in series with the load 18. Another known approach is to couple a Hall effect device to the load 18.

First, the use of a Hall effect device involves complicated circuit design and thus costly. In addition, a Hall effect device is spacious. The use of Hall effect devices in most instances are not practical.

The use of shunt resistors for current detection is a common practice but it involves considerable shortfalls. To understand the drawbacks associated with using a shunt resistor, the basic principles of a DC-to-DC converter needs first be explained. Reference is now directed back to FIG. 1. In the DC-to-DC converter 2, if the transformer 8 is a step-down transformer, as is known in the art, the primary and secondary voltages $v_P$ and $v_S$, across the primary and secondary windings 12 and 20, respectively, assume a directly proportional relationship in accordance with the following algebraic expression:

$$\frac{v_P}{v_S} = \frac{N1}{N2} \qquad (1)$$

However, the primary and secondary currents $i_P$ and $i_S$ relate to each other by an inversely proportional relationship as expressed by the following mathematical relationship:

$$\frac{i_P}{i_S} = \frac{N2}{N1} \qquad (2)$$

In a step-down transformer, the secondary voltage $v_S$ is lower than the primary voltage $v_P$. However, the secondary current $i_S$ is higher than the corresponding primary current $i_P$. In most applications with a DC-to-DC converter, such as the converter 2, the output voltage $V_{OUT}$ is much lower than that input voltage $V_{IN}$, resulting in the output current $I_{OUT}$ much higher than the corresponding input current $I_{in}$. In practice, sensing a high current always posses technical complications and sometimes fraught with danger. Chief among all is the difficulty in the power management of the shunt resistor. Even though the shunt resistor is normally designed to have a small ohmic value, in terms of degree of difficulty in managing the power of the shunt resistor, the high output current $I_{OUT}$ passing through the shunt resistor more than compensates for the choice of low resistive value of the shunt resistor in the first place. As is well known, power consumption of a resistor when current passes through the resistor has the following relationship:

$$P = I_{OUT}^2 R \qquad (3)$$

where P is the power consumed by the shunt resistor in Watts; R is the ohmic value of the shunt resistor; and $I_{OUT}$ is as defined above.

Very often, to make up for the lowering of the resistive value R of the shunt resistor, a shunt resistor with a large physical size has to be selected. Modern day designs of power converters require compactness where the use of large components are not practical. The shunt resistor usually needs to be scaled down in physical size. As a consequence, current through the shunt resistor must be increased resulting in excessive power loss via wasteful heat generated out of the shunt resistor. As shown in equation (3), the relationship between the power consumption P and the current $I_{OUT}$ is not linear, Rather, the power consumption P is proportional the square of the current $I_{OUT}$ passing through the resistor. A small increase in current always results in a significant increase in power dissipation. Further, as is also known in the art, heat also effects the resistive value of a resistor. Excessive self-generated heat from the shunt resistor may render the resistive value of the shunt resistor unreliable and thus may yield inaccurate current reading of the output current $I_{OUT}$. Sophisticated thermal management or temperature compensation circuitry may be implemented to rectify such shortfalls but it surely will result in high manufacturing cost and design complication.

Without resorting to costly and complex designs, there is a need to provide better solutions in sensing output current of a DC-to-DC power converter.

SUMMARY OF THE INVENTION

It is accordingly the object of the invention to provide a DC-to-DC power converter with a current sensing mechanism having relative ease and simplicity in implementation. It is also another object of the invention to provide such a converter at low cost and high operational reliability.

The DC-to-DC power converter in accordance with the invention includes a transformer disposed between an input circuit and an output circuit. The transformer has primary and secondary windings coupled to the respective input and output circuits. Current passing through the input circuit is sensed and detected by a detecting circuit which generates a signal proportional in magnitude to the output current sourcing out of the output circuit. If the converter is a step-down converter, the output current is higher than the input current. As arranged, sensing and monitoring input current instead of the output current allows simpler circuit design, lower cost and higher operational reliability.

These and other features and advantages of the invention will be apparent to those skilled in the art from the following detailed description, taken together with the accompanying drawings, in which like reference numerals refer to like parts.

DETAILED DESCRIPTION OF THE INVENTION

Figure 2:
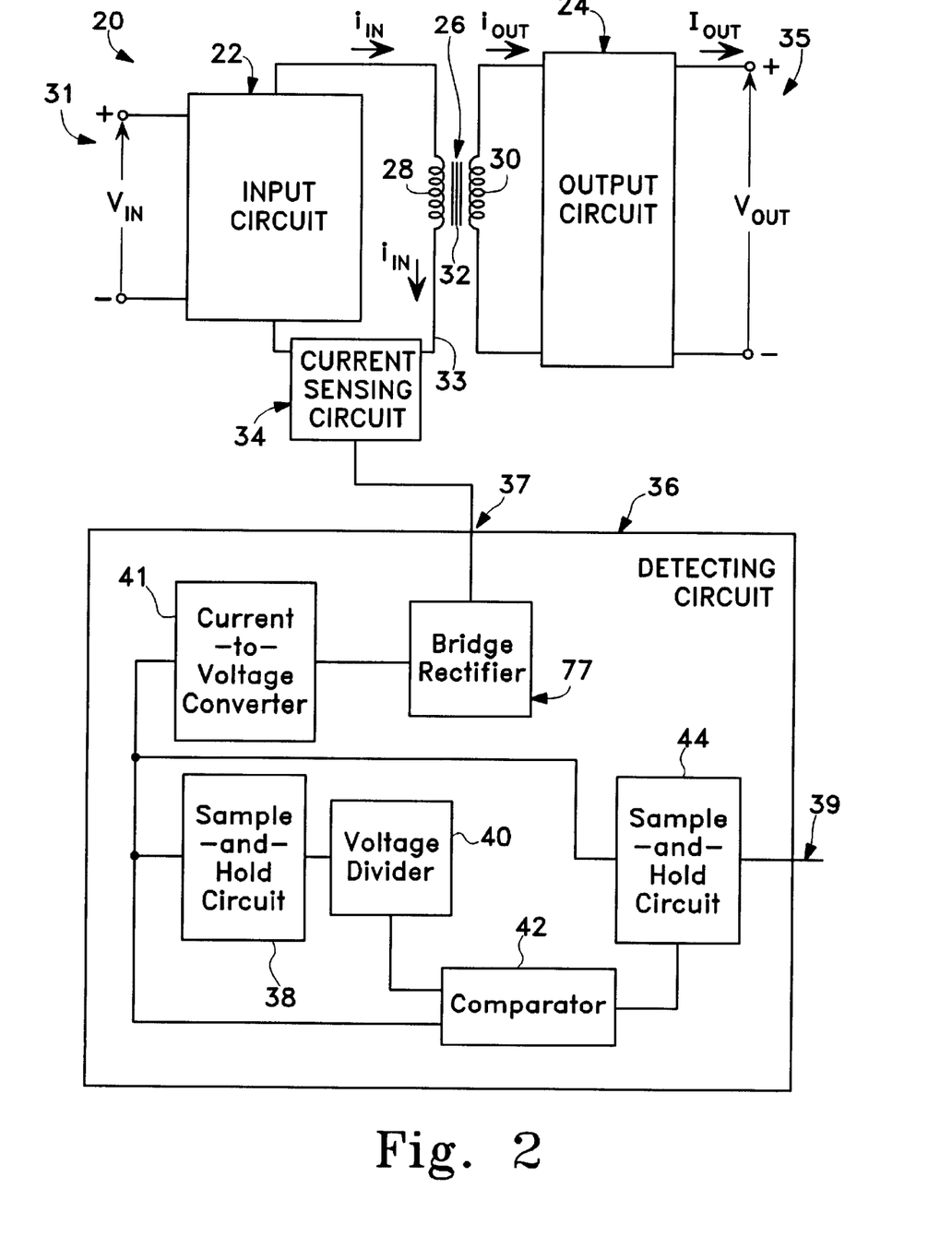
FIG. 2 is a schematic drawing showing the general architecture of the invention.

Reference is now directed to FIG. 2 which shows the overall architectural design of the invention signified by the reference numeral 20. In the following paragraphs, the invention is generally depicted, followed with a more detailed description of the embodiments.

The invention includes an input circuit 22 and an output circuit 24. Disposed between the input and output circuits 22 and 24 is a transformer 26, which has a primary winding 28 and a secondary winding 30 wound around a core 32. The input circuit 22 is connected to the primary winding 28, while the output circuit 24 is tied to the secondary winding 30. In operation, the circuits 22, 24 and the transformer 26 cooperatively function together and convert a DC input voltage supply $V_{IN}$ to a DC output voltage $V_{OUT}$. The DC input voltage supply $V_{IN}$ is applied to the input 31 of the input circuit 22. The input circuit 22 is a power switching circuit which basically chops the DC voltage $V_{IN}$ into a time-varying voltage with periodic pulses. The transformer 26 thereafter transforms the time-varying voltage to the output circuit 24 which in turn rectifies the transformed voltage to the DC output voltage $V_{OUT}$ available at the output 35 of the output circuit 24.

The input circuit 22 provides the time-varying input current $i_{IN}$ that flows through the primary winding 28 of the transformer 26 via a current path 33 which directly exits out of the primary winding 28. A current sensing circuit 34 is coupled to the current path 33. The current sensing circuit 34 senses the time-varying input current $i_{IN}$ and generates a signal which feeds into a detecting circuit denoted by the reference numeral 36.

The detecting circuit 36 has an input 37 and an output 39. There is a bridge rectifier 77 disposed between a current-to-voltage converter 41 and the input 37. The current-to-voltage converter 41 is tied to a first sample-and-hold circuit 38, which in turn drives a voltage divider 40. The output of the current-to-voltage converter 41 and the output of the voltage divider 40 are fed to a comparator 42 which is installed to perform voltage level comparisons and generate control signals driving a second sample-and-hold circuit 44. The output of the second sample-and-hold circuit 44 is also the output of the detecting circuit 36 and is denoted by the reference numeral 39. The output 39 provides a signal which bears a definite relationship to the output current $I_{OUT}$ flowing out of the output circuit 24. The operational details of the detecting circuit 36 will be further discussed later in conjunction with the description of the various embodiments.

Figure 3:
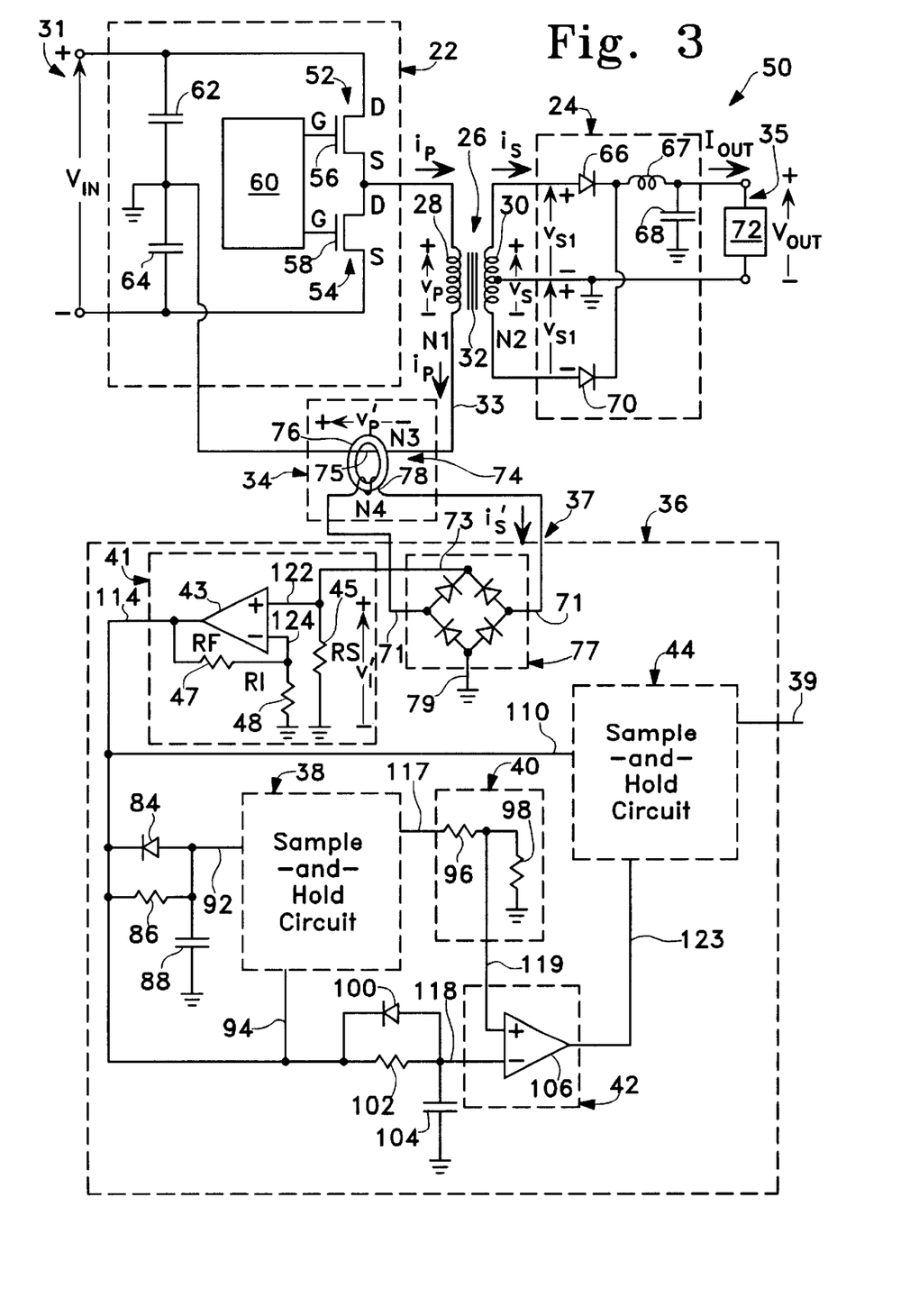
FIG. 3 is a schematic drawing showing the implementation of a first embodiment of the invention.

FIG. 3 shows a first embodiment of the invention generally designated by the reference numeral 50. In this embodiment, the input circuit 22 is implemented as a half-bridge switching circuit which includes two switches 52 and 54. In this instance, switches 52 and 54 are FETs (Field Effect Transistors) 56 and 58, respectively, controlled by a control circuit 60. Each of the FETs 56 and 58 has a source S, drain D, and a gate G. The gates G of the two FETs 56 and 58 are tied to the two outputs of the control circuit 60. The drain D of the FET 56 is attached to the positive terminal of the input voltage $V_{IN}$. In a similar manner, the source S of the FET 58 is connected to the negative terminal of the input voltage $V_{IN}$. The source S of the FET 56 and the drain D of the FET 58 are linked together and connected to one end of the primary winding 28. The other end of the primary winding 28 is routed to the ground terminal which is separated by two buffering capacitors 62 and 64 that are installed to provide the transformer 26 with a mid reference voltage point for the input voltage $V_{IN}$.

The transformer 26 of this embodiment is a step-down transformer having N1 and N2 winding turns for the primary and secondary windings 28 and 30, respectively. Phrased differently, the transformer 26 is a step-down transformer with a coupling ratio of N1/N2.

The output circuit 24 essentially is a rectifying circuit which includes one diode 66 with the anode connected to one of the secondary winding 30. The cathode of the diode 66 is coupled to a filter inductor 67 which in turn feeds a filter capacitor 68. Likewise, there is another diode 70 with the anode tied to the other end of the secondary circuit 30 and the cathode also coupled to the inductor 67.

The secondary winding 30 is center-tapped and goes to the ground terminal. During operation, the output 35 of the output circuit 24 drives a load 72.

Attention is now directed back to the input circuit 22. As mentioned earlier, existing out of the primary winding 28 is the current path 33 which goes through the current sensing circuit 34. In this embodiment, the current sensing circuit 34 is a current transformer 74 having a toroid core 76. The current path 33 of the input circuit 22 is connected to the primary winding 75 of the current transformer 74. Wound around the toroid core 76 is also a secondary winding 78 which feeds the AC input terminals 71 of a bridge rectifier 77. As with the transformer 26, there are N3 and N4 winding turns in the primary and secondary windings 75 and 78, respectively. Thus, the sensing transformer 74 has a coupling ratio of N3/N4. In this embodiment, as in most applications, N3 has only one winding turn. As for winding turns N4 of the secondary winding 78, depending on application, N4 can range from few turns to hundreds of turns.

Reference is now directed to the detecting circuit 36. The input 37 of the detecting circuit 36 routes directly to the bridge rectifier 77. In this case, the two terminals of the secondary winding 78 of the transformer 74 is tied to the two AC inputs 71 of the rectifier 77. The positive DC output 73 is connected to the non-inverting input 122 of the current-to-voltage converter 41. The negative DC output 79 of the rectifier 77 goes to the ground terminal.

The current-to-voltage converter 41 is basically an operational amplifier 43 having a gain g expressed by the following equation:

$$g = 1 + \frac{RF}{RI} \quad (4)$$

where g is the gain of the amplifier defined as the ratio of the output voltage to the non-inverting input voltage; RF and RI are respectively the resistive values of the resistors 47 and 48, in which resistor 47 is tied between the output 114 and the inverting input 124 of the amplifier 43, and resistor 48 is disposed between the inverting input 124 and the ground terminal, as shown in FIG. 3. Equation (4) can be derived from basic circuit theories by assuming the basic operational amplifier characteristics having infinite impedance at both the inverting and non-inverting inputs 124 and 122 of the amplifier 43.

The output 114 of the current-to-voltage converter 41 links directly to a diode 84 and a resistor 86 connected in parallel. In particular, the cathode of the diode 84 is tied to the output 114 of the current-to-voltage converter 41 and the anode of the diode 84 is connected to a capacitor 88. The anode of the diode 84 is also connected to the sample-and-hold circuit 38. The resistor 86 is connected across the diode 84.

In this embodiment, the sample-and-hold circuit 38 has an input 92, an output 117, and a control line 94. The output 117 of the sample-and-hold circuit 38 drives the voltage divider 40 which comprises two resistors 96 and 98 connected in series. The common connection node 119 of the resistors 96 and 98 is tapped and routed to one input of the comparator 42. The other input of the comparator 42 is directed to the output 114 of the current-to-voltage converter 41 through another pair of diode 100 and resistor 102 connected in parallel. As with the previous diode-resistor pair, the cathode of the diode 100 is connected to the node 114 and the anode of the diode 100 is connected to the input 118 of the comparator 42. The resistor 102 is laid across the diode 100. There is also a capacitor 104 connected from the node 118 to the ground terminal. The comparator 42 in this embodiment is a differential amplifier 106.

The output of the comparator 42 controls the second sample-and-hold circuit 44 which also has an input 110, an output 39, and a control line 123. In particular, the output of the comparator 106 drives the control line 123 of the second sample-and-hold circuit 44, as shown in FIG. 3.

Figure 4:
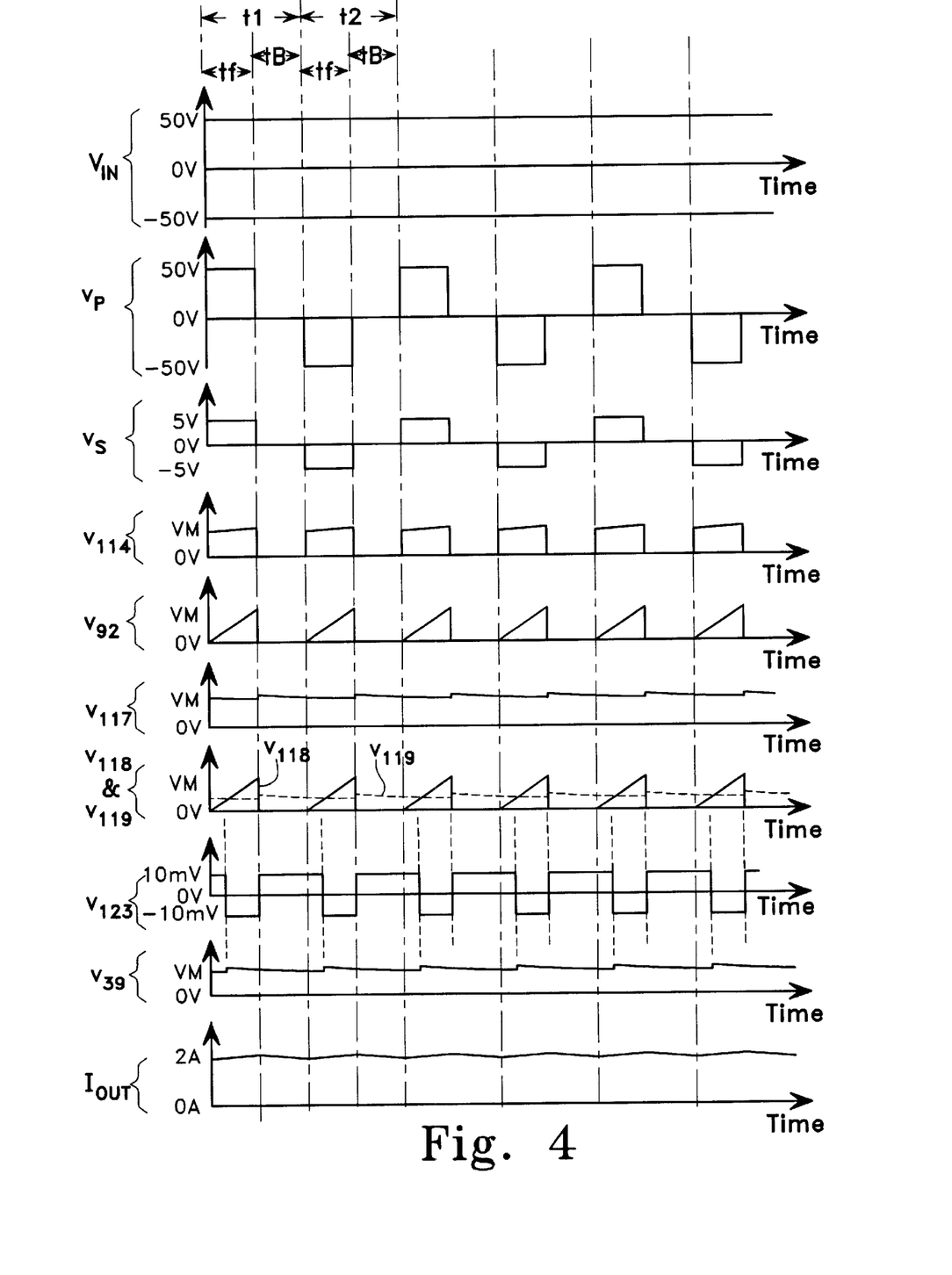
FIG. 4 is a timing diagram illustrating the waveforms of the invention during normal operation.

The operation of the first embodiment 50 is herein described by referring to the timing diagram of FIG. 4 in conjunction with FIG. 3. For ease of explanation, numerical values are used. It should be noted that the numerical values used are by no means construed as limiting and are presented herein only for reference purposes. suppose an input DC voltage $V_{IN}$ of 100 V peak-to-peak is intended to be converted to an output voltage $V_{OUT}$ of 5 V. The output current $I_{OUT}$ driving the load 72 needs to be constantly sensed during normal operation.

First, the DC input voltage $V_{IN}$ is applied to the input 31 of the input circuit 22. In this instance, the input ranges from the negative polarity of −50 V to the positive polarity of +50 V. The input voltage $V_{IN}$ basically is applied across the two FETs 56 and 58, which are turned on and off alternatively as controlled by the control circuit 60. Specifically, during the time period t1 (FIG. 4), when the FET 56 is turned on, the FET 58 is turned off. The primary current $i_P$ flows from the positive terminal of the input 31 through the FET 56 and then the primary winding 28. Thereafter, the current $i_P$ returns to the ground terminal. In the next cycle during the time period t2, the FET 56 is turned off but FET 58 is turned on. This time, the current $i_P$ flows from the ground terminal, through the primary winding 28 and then the FET 58, and thereafter returns to the negative terminal of the input 31.

The alternating turning on and off of the FETs 56 and 58 in essence chops the DC input voltage $V_{IN}$ into a time-varying signal as waveform $v_P$ across the primary winding 28. The wave shape of the time-varying signal $v_P$ is as shown in FIG. 4. It should be noted that for each cycle period t1 or t2, there is a blanking time tB superimposed within. During the time period tB, both the FETs 56 and 58 are shut off. The blanking period tB is built in to prevent any simultaneous turning on of both FETs 56 and 58. Phrased differently, without the blanking period tB, there is a possibility that both the FETs 56 and 58 are simultaneously on, which may consequently result in a huge surge of current from the positive terminal to the negative terminal of the input 31, thereby damaging the FETs 56, 58 and possibly the input power supply source (not shown) that supplies the input voltage $V_{IN}$.

Voltage at the secondary winding $v_S$ basically assumes the same wave shape as the primary winding voltage $v_P$ but is stepped down in amplitude by the ratio N1/N2. In this case the coupling ratio N1/N2 is 10. The secondary winding voltage $v_S$ waveform is as shown in FIG. 4. The relationship between the secondary current is and the primary current $i_P$ of the transformer 26 can be expresses as follows, in accordance with equation (2):

$$\frac{i_S}{i_P} = \frac{N1}{N2} \quad (5)$$

It also should be noted that the primary current $i_P$ flowing through the primary winding 28 is composed of two components, namely, the magnetizing current, and the load current. The magnetizing current is needed to sustain change of magnetic flux in the transformer core 32 of the transformer 26, even without any load on the secondary winding 30. However, in practice, the magnetizing current is small in comparison to the load current and thus can be neglected. That is, for practical purposes, in equation (5), the primary current $i_P$ can be assumed to contain only the load current.

Reference is now directed to the current path 33 of the input circuit 22. As described above, the current transformer 74 is coupled to the current path 33. The primary current $i_P$ passing through the primary winding 28 of the transformer 26 also passes through the primary winding 75 of the sensing transformer 74. From equation (2) above, a secondary current $i'_S$ is also induced into the secondary winding 78 of the transformer 74 as expressed by the following algebraic equation:

$$\frac{i'_S}{i_P} = \frac{N3}{N4} \quad (6)$$

Combining equations (5) and (6), it can be shown that the secondary current $i_S$ of the transformer 26 and the secondary current $i'_S$ of the transformer 74 bear a definite relationship to each other and is expressed by the following expression:

$$i_S = \left(\frac{N1}{N2}\right)\left(\frac{N4}{N3}\right) i'_S \quad (7)$$

Thus, if the secondary current $i'_S$ of the sensing transformer 74 can be ascertained, the secondary current $i_S$ of the transformer 26 can also be determined. The detecting circuit 36 is installed to perform this task.

First, the secondary current $i'_S$ of the sensing transformer 74 needs to be converted to a voltage value. To accomplish this end, the secondary current $i'_S$ sourcing out of the secondary winding 78 of the transformer 74 is first rectified by the bridge rectifier 77. A rectified current $i'_S$ results and is then fed to the non-inverting input 122 of the operating amplifier 43. As mentioned before, the input 124 is assumed to have an infinite impedance. Thus, when the rectified secondary current $i'_S$ flows through the resistor 45, the voltage at the non-inverting input 122 is developed and is expressed by the following algebraic relationship:

$$v_{122} = RS\, i'_S \quad (8)$$

where $R_S$ is the Ohmic value of the resistor 45 and the $v_{122}$ is the voltage value at the non-inverting input 122 of the operational amplifier 43. Hereinafter, any voltage or current symbol with the accompanying number as subscript denotes the voltage or current value at the node identified by the subscript. Thus, for example, $v_{122}$ denotes the voltage value at the node 122.

Since the output voltage $v_{114}$ is the gain g of the amplifier 43 multiplied by the input voltage $v_{122}$ as described above, combining equations (4) and (8), the output voltage $v_{114}$ at the output node 114 of the current-to-voltage is converter 41 can be expressed as follows:

$$v_{114} = \left(1 + \frac{RF}{RI}\right) RS\, i'_S \quad (9)$$

where RF and RI are respectively the ohmic values of the resistors 47 and 48.

Combining equations (7) and (9), the secondary current $i_S$ of the transformer 26 can be mathematically expressed as a function of the secondary voltage $v_{114}$ of the sensing transformer 74 as follows:

$$i_S = \left(\frac{N1}{N2}\right)\left(\frac{N4}{N3}\right) \frac{v_{114}}{RS\left(1 + \frac{RF}{RI}\right)} \quad (10)$$

The waveform of the resultant voltage $v_{114}$ is shown in FIG. 4. The wave shape of the secondary voltage $v_{114}$ substantially assumes the same shape as that of the primary voltage $v_P$ of the transformer 26 but is rectified and further with a different amplitude. In this particular case, peak current and voltage values are of special interest. The secondary current $i_S$ has a peak current value IM. Likewise, the voltage $v_{114}$ has a peak value of VM. In the special case where only peak values are involved, equation (10) can be rewritten as follows:

$$IM = \left(\frac{N1}{N2}\right)\left(\frac{N4}{N3}\right) \frac{VM}{RS\left(1 + \frac{RF}{RI}\right)} \quad (11)$$

Referring to the output circuit 24 in FIG. 3, after rectification through the circuit 24, the output current $I_{OUT}$ basically maintains a DC level and its value is the peak current value IM of the secondary current is. Thus, equation (11) can be rewritten again as follows:

$$I_{OUT} = \left(\frac{N1}{N2}\right)\left(\frac{N4}{N3}\right) \frac{VM}{RS\left(1 + \frac{RF}{RI}\right)} \quad (12)$$

where the parameters are all defined as above. From equation (12), the output current $I_{OUT}$ passing through the load 72 varies linearly with the peak voltage VM. The peak voltage VM is the peak voltage value of the output voltage $v_{114}$ of the current-to-voltage converter 41. The detection circuit 36 provides the peak voltage VM at the output node 39 (FIG. 3). Thus, if the voltage at the output 39 of the detecting circuit 36 is known, the load current $I_{OUT}$ can be determined, in accordance with equation (12). The following description describes the process the detecting circuit 36 detects and provides the voltage level VM at the output 39.

Reference is now directed back to the detecting circuit 36. Assuming the capacitor 88 is initially discharged. When the rectified secondary current $i'_S$ impinges upon the input 37 of the current-to-voltage converter 41, the current $i'_S$ is translated into a corresponding secondary voltage $v_{114}$ is at the output node 114 of the current-to-voltage converter 41. At the onset the time interval t1 when the voltage $v_{114}$ is at its positive polarity, the diode 84 is reversed biased since the capacitor 88 is not initially charged and is thus close to the ground potential. As such, the voltage $v_{114}$ charges through the RC (resistance-capacitance) path via the resistor 86 and the capacitor 88 to the ground terminal. The resultant wave shape is illustrated as $v_{92}$ as shown in FIG. 4.

During the time period t1 and entering into the blanking period $t_B$, both FETs 56 and 58 are turned off. There is no primary current $i_P$ flowing through the primary circuit 28, and consequently voltage $v_{114}$ returns to zero. This time the charged capacitor 88 swiftly discharges through the forward-biased diode 84 instead of the resistor 86. After the discharge, the node 92 stays at zero potential.

Entering into the time period t2, the process repeats itself in the same manner as in the time period t1.

The resultant signal $v_{92}$ as mentioned above impinges upon the first sample-and-hold circuit 38. The sample-and-hold circuit 38 is triggered into action at the falling edge of any signal at the control input 94. Once the sample-and-hold circuit 38 is activated, it samples the input signal at its input 92, which is the voltage $v_{92}$ at the node 92 in this case, and holds the sampled voltage level until the next falling edge of the signal occurs at the control line 94.

The waveform of the output voltage $v_{117}$ of the sample-and-hold circuit 38 is shown in FIG. 4.

The voltage at the output node 117 $v_{117}$ of the sample-and-hold circuit 38 is divided by the voltage divider 40 which is made up of the two resistors 96 and 98 connected in series as shown in FIG. 3. The output node 119 of the voltage divider 40 is located between the two resistors 96 and 98. Preferably, the resistors 98 and 96 have equal values and thus the voltage at the node 119 is half that of the value at the node 117. The reason for this preference will be explained later.

In front of the comparator 42 is another pair of resistor 102 and diode 100, which has the same values as the corresponding resistor 86 and diode 84. As such, the waveform at negative differential input node 118 of the comparator 42 is the same as the corresponding waveform at the input node 92 of the first sample-and-hold circuit 38. The waveform at the node 118 $v_{118}$ is as shown in FIG. 4. Superimposed with the waveform at the node 118 $v_{118}$ shown in FIG. 3 is the waveform out of the voltage divider 40 at the node 119 $v_{119}$ (shown in broken line), which is fed to the non-inverting input of the comparator 42.

As shown in FIG. 3, when the voltage value at the node 118 ramps up and exceeds the voltage value at the node 119, the signal level of the output 123 of the comparator 42 switches from high to low, resulting in a falling voltage level transition which directly feeds into the control input 123 of the second sample-and-hold circuit 44. The waveforms of the voltages $v_{118}$ and $v_{119}$ are as shown in FIG. 4. Voltage $V_{118}$ assumes a sawtooth wave shape, while voltage $v_{119}$ coming out of the voltage divider 40 somewhat maintains a DC level. In the voltage divider circuit 40, if the resistors 96 and 98 are chosen to be equal in value, the DC level value of the voltage $v_{119}$ will be approximately one half of the peak value VM of the voltage $v_{118}$. Thus, the sampling transition can be positioned around the middle of each ramping slope of the sawtooth waveform for the voltage $v_{118}$. That is, the falling edge of the control line 123 for the second sample-and-hold circuit 44 can be timed to be around the middle of each current pulse during the forward conduction period of the node voltage $v_{144}$.

Figure 4A:
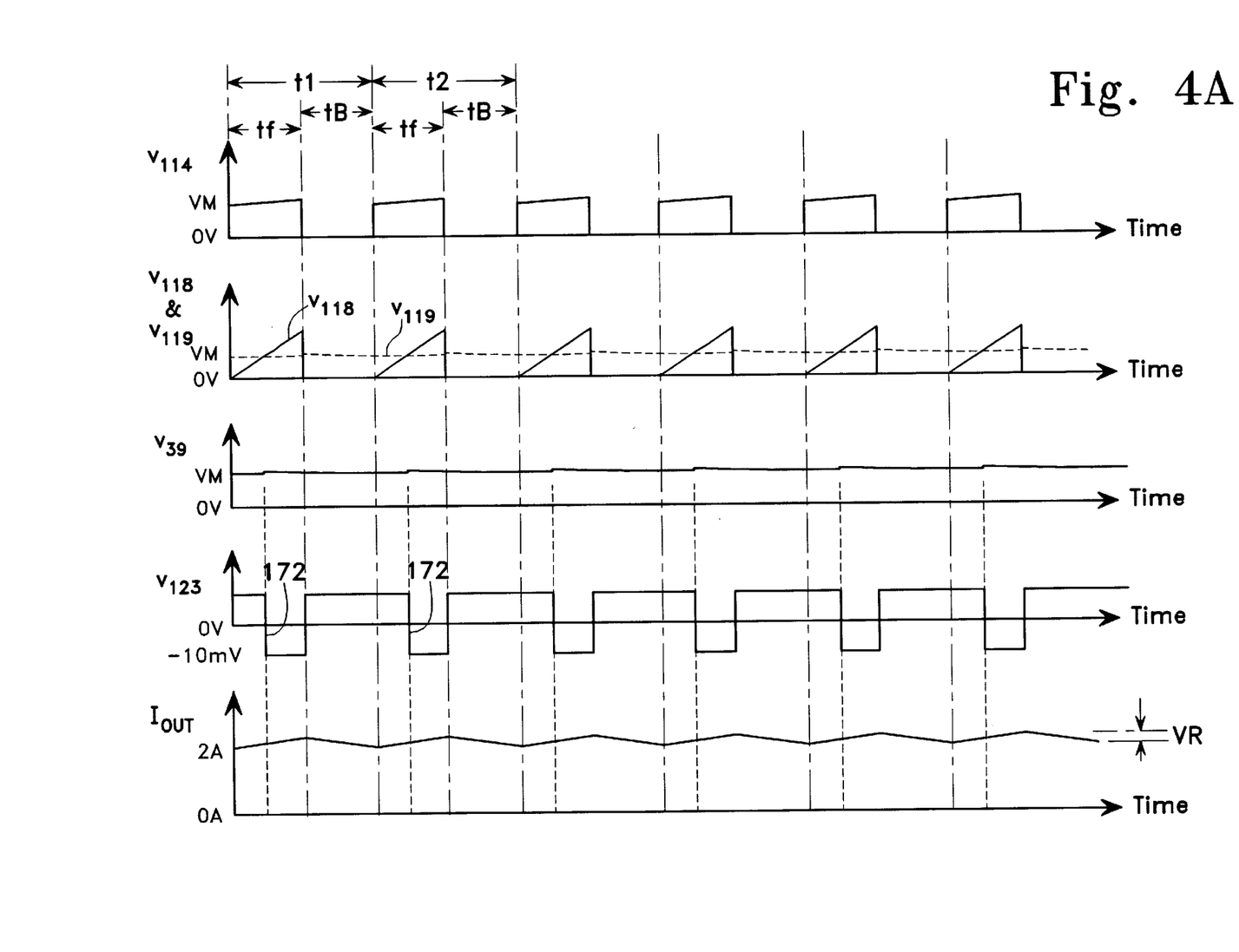
FIG. 4A is a timing diagram showing selective waveforms of FIG. 4 for timing analysis.

The mid sampling of each forward conduction pulse of the voltage $v_{144}$ has specific significance. Reference is now directed to FIG. 4A, where pertinent waveforms from FIG. 4 are enlarged and re-displayed. As can be seen, when the resistor values of the resistors 96 and 98 of the voltage divider 40 are chosen to be equal (FIG. 3), the output voltage $v_{123}$ of the comparator 42 can be triggered to generate a falling edge close to the mid point of each conduction pulse for the output voltage $v_{114}$ of the current-to-voltage converter 41. The falling edge is identified by the reference numeral 172 in FIG. 4A. Suppose the output load current $I_{OUT}$ is coupled with ripples VR as shown in FIG. 4A. The ripples VR are chiefly caused by the charging and discharging of the secondary current $i_S$ in the secondary circuit 24. The mid sampling of the voltage $v_{114}$ allows the second sample-and-hold circuit 44 to provide an output voltage level VM which corresponds to the average value of the output current $I_{OUT}$, as identified by the reference numeral 173 shown in FIG. 4A, irrespective of any superimposed ripples VR.

In contrast, detecting current directly from the output of the output circuit 24 without the invention involves implementing detecting circuits that deal with currents of high magnitudes. As mentioned before, such implementation entails more complexity, higher power loss, and associated disadvantages as mentioned above.

Figure 5:
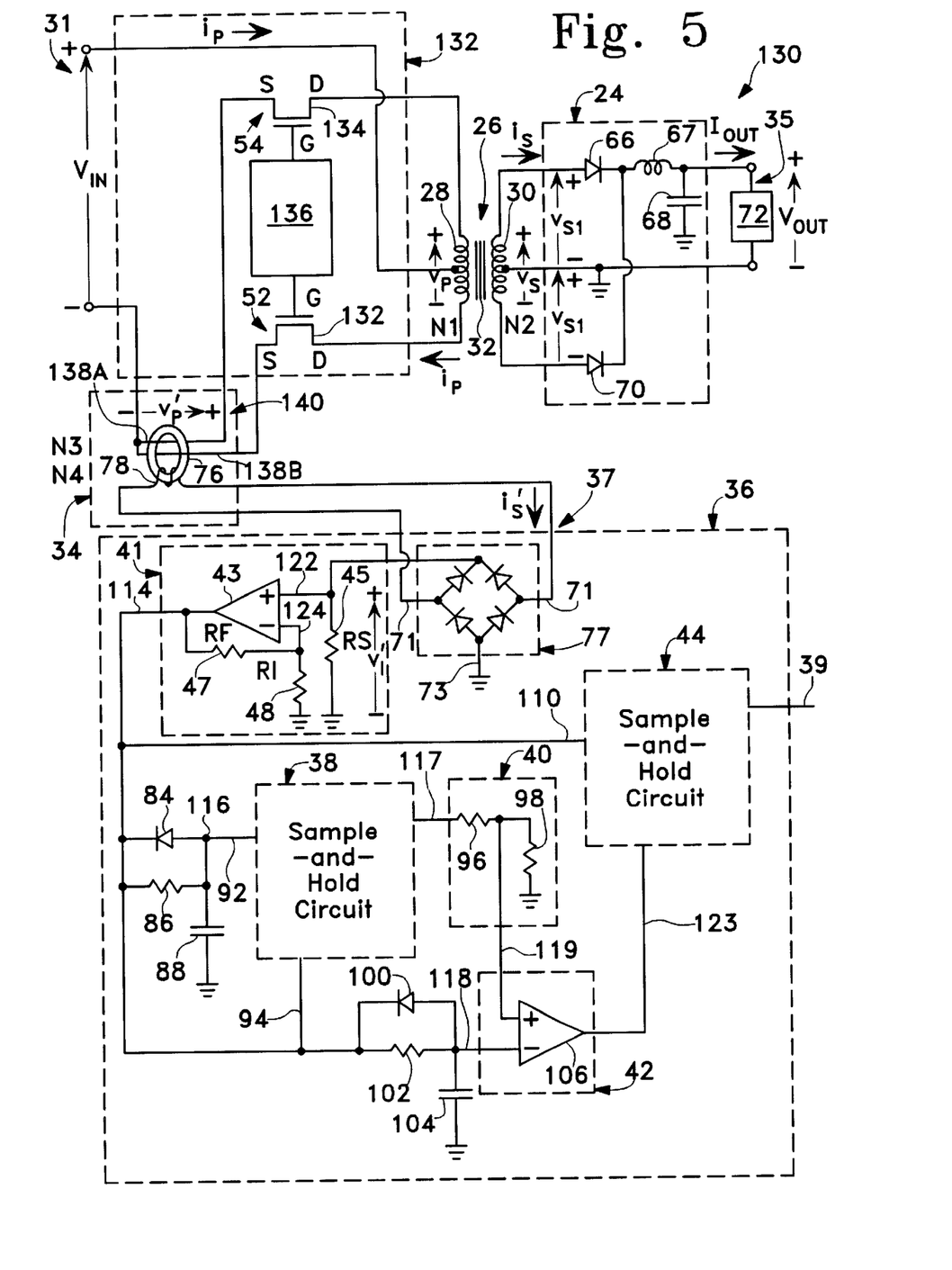
FIG. 5 is a schematic drawing showing the implementation of a second embodiment of the invention.

FIG. 5 shows the second embodiment of the invention signified by the reference numeral 130. This embodiment 130 is substantially similar to the previous embodiment 50. For the sake of conciseness, only the differences are herein highlighted.

The embodiment of this invention differs from the previous embodiment in the structural arrangement of the input circuit 132. Instead of a half-bridge switching circuit, the input circuit 132 is a push-pull circuit.

The input circuit 132 includes a pair of switches 52 and 54, implemented as FETs 132 and 134, respectively, in this case. Each of the FETs 132 and 134 has a drain D, a source S, and a gate G. The drain D of the FET 132 is tied to one end of the primary winding 28. The other end of the primary winding 28 connects to the drain D of the other FET 134. The two gates G of the FETs 132 and 134 are controlled by a control circuit 136. The two sources S of the FETs 132 and 134 are connected to the two primary windings 138A and 138B, respectively, of the sensing transformer 140 and will be described further below.

In this embodiment, the primary winding 28 of the transformer 26 is center-tapped and is routed to the positive terminal of the input 31 in the input circuit 132.

Similar to the previous embodiment, the current sensing circuit 34 is a current transformer 140 with a toroid core 76. Wound around the toroid core 76 is a secondary winding 78 which are connected across the AC terminals 71 of a bridge amplifier 77. As mentioned earlier, there are two primary windings 138A and 138B wound around the core 76. It should be noted that the winding directions of the winding 138A and 138B are opposite to each other, as shown in FIG. 5. Thus, when the primary current $i_P$ flows from the source S of the FET 132 into the primary winding 138A, it generates a magnetic flux in the core 76. However, when the primary current $i_P$ flows from the source S of the FET 134 into the other primary windings 138B, it generates another magnetic flux in the core 76 with an equal flux magnitude but an opposite flux direction. Thus, there is no DC bias existing in the core 76.

The operation of the second embodiment 130 is also substantially similar to the first embodiment 50. In fact, the same timing diagram as shown in FIG. 4 can also be used. Again, for conciseness and ease of explanation, numerals values are used. These numerical values are intended to be exemplary and by no means construed as limiting.

Reference is now directed to FIG. 5 in conjunction with FIG. 4. First, a DC input voltage $V_{IN}$ is applied to the input 31 of the input circuit 132. In this instance, the input ranges from the negative polarity of −50 V to the positive polarity of +50 V. As with the previous embodiment, the two FETs 132 and 134 are turned on and off alternatively by the control circuit 60. There are also blanking periods tB instituted between the turning on and off the FETs 56 and 58. Specifically, during the time period t1, when the FET 132 is turned on, the FET 134 is turned off. The current $i_P$ flows from the positive terminal of the input 31 through the primary winding 28 and the FET 132. Thereafter, the current $i_P$ passes through the toroid core 76 of the sensing transformer 140. As a consequence, a positive pulse is induced in the secondary winding 78 of the transformer 140 as a positive pulse, as shown in the waveform $v_{114}$ during the period t1 in FIG. 4. During the blanking time tB within the time period t1, both the FETs 132 and 134 are turned off. No voltage is induced in the secondary winding 78.

During the time period t2, when the FET 134 is turned on, the FET 132 is turned off. The current $i_P$ flows from the positive terminal of the input 31 through the primary winding 28 and the FET 134. Then, the current $i_P$ passes through the toroid core 76 of the sensing transformer 140. This time, a negative pulse is induced in the secondary winding 78 of the transformer 140, as shown in the waveform $v_{114}$ during the period t2 in FIG. 4. Again, during the blanking time tB within the time period t1, both the FETs 132 and 134 are turned off. No voltage is induced in the secondary winding 78. With the secondary voltage $v'_S$ available at the input 37 of the detecting circuit 36, the detecting process is substantially similar to that of the previous embodiment and is thus not further repeated.

Figure 6:
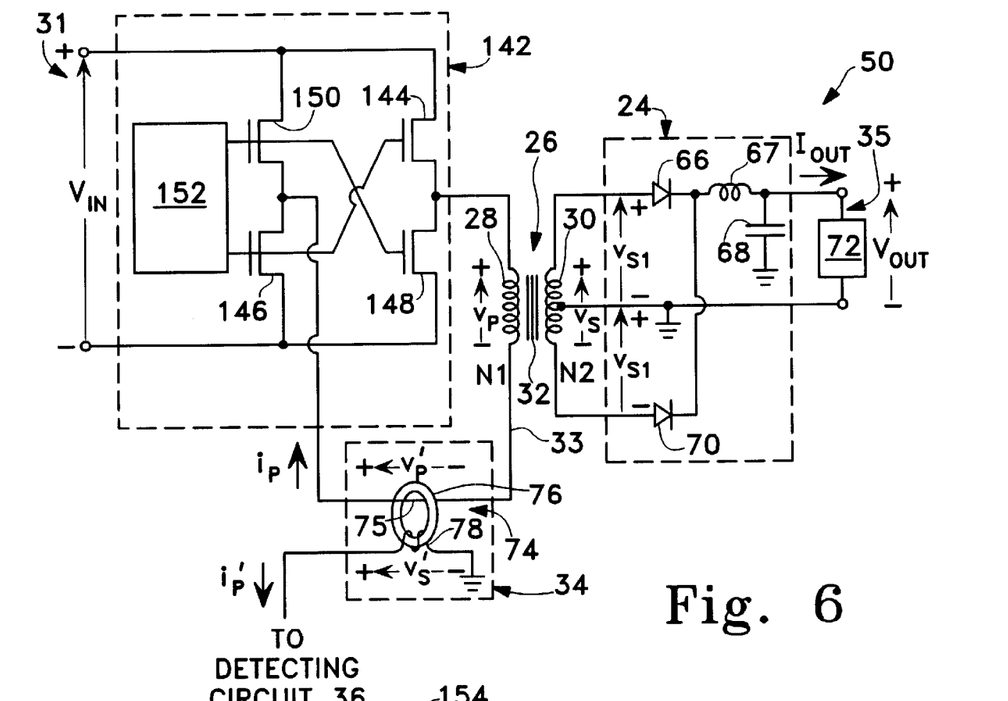
FIG. 6 is a schematic drawing showing a variation of the implementation of the first embodiment.

Finally, other changes are possible within the scope of the invention. Described in the first embodiment 50, the input circuit 22 is depicted as a half-bridge switching circuit. It is possible that the input circuit 22 can be slightly modified as input circuit 142 which is a full-bridge switching circuit as shown in FIG. 6. In input circuit 142, it includes four FET switches 144, 146, 148 and 150 controlled by the controlled circuit 152. During the time period t2 (FIG. 4), FETs 144 and 146 are turned on while FETs 148 and 150 are turned off. Conversely, during the time period t1 (FIG. 4), FETs 148 and 150 are turned on while FETs 144 and 146 are turned off. The resultant secondary voltage $v_{114}$ across the secondary winding 78 of the transformer 74 is the same as that of the first embodiment and as shown in FIG. 4.

Figure 7:
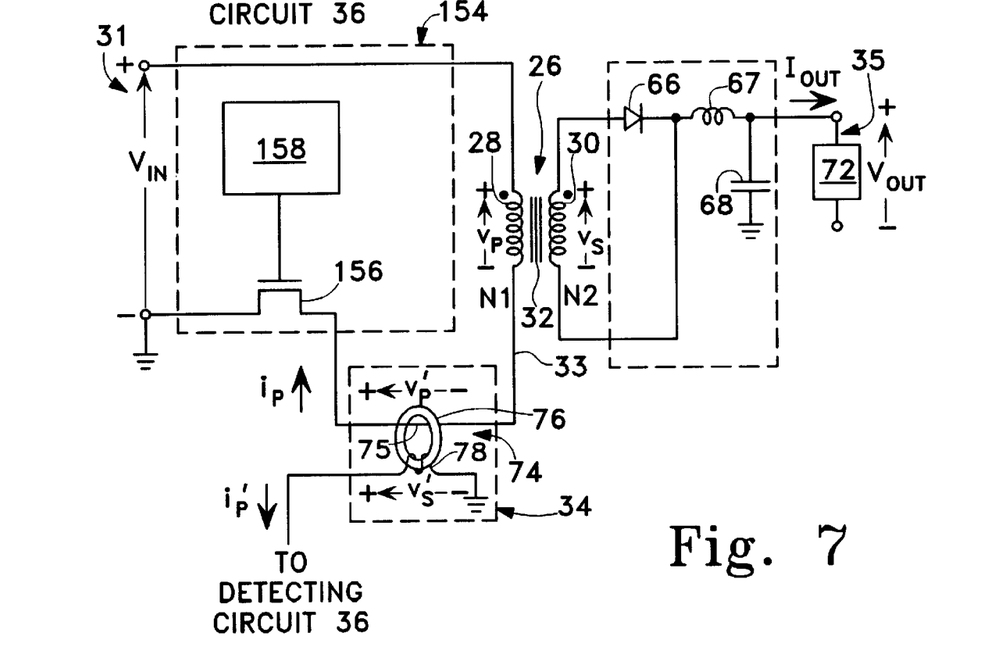
FIG. 7 is a schematic drawing showing another variation of the implementation of the invention.

It is also conceivable that the input circuit can be implemented with a single switch as shown in FIG. 7, which input circuit is denoted by the reference 154. Disposed inside the input circuit 154 is a FET 156 controlled by a control circuit 158. The FET 156 is tied to the primary winding 28. During operation, the FET 156 switches on and off and thereby chopping the input voltage $V_{IN}$ into a time-varying signal $v_{IN}$ in a similar manner as the previous embodiments. One major difference between this embodiment and the previous embodiments is that there is a DC bias in the core 76. The DC magnetization must be reset at each switching cycle to prevent accumulation of magnetic saturation. Further the bridge rectifier 71 in the detecting circuit 36 (FIGS. 3 and 5) needs to be replaced with a single diode.

Figure 8:
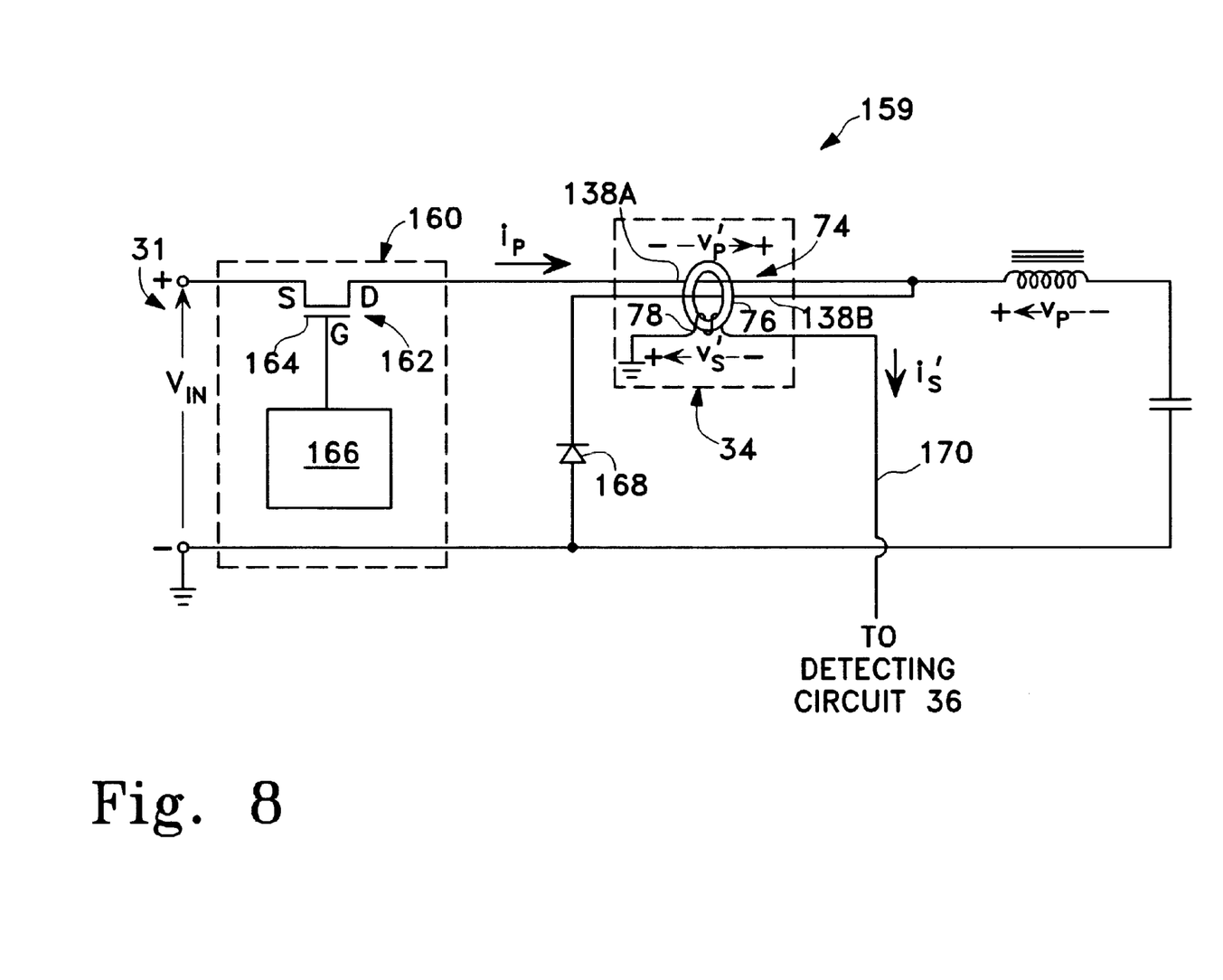
FIG. 8 is a schematic drawing showing yet another variation of the implementation of the invention.

In addition, the input circuit can be implemented in the form of a buck switching circuit signified by the reference numeral 159 as shown in FIG. 8. In this implementation, the input circuit 160 includes a switch 162 which is a FET 164 driven by a control circuit 166. The FET 164 has a drain D, a source S, and a gate G. The drain D of the FET 164 is tied to a first primary winding 138A of the transformer 74. A second primary winding 138B wound in the opposite direction of the first primary winding 138A around the toroid core 76 of the transformer 74 is connected to the ground terminal through a freewheel diode 168. The primary winding configuration of this converter 159 is substantially similar to the second embodiment 130 shown in FIG. 5. Thus, as in the second embodiment 130, the currents flowing through the two primary windings 138A and 138B generate opposite flux in the core 76. Nor is there any need for sample-and-hold circuits in the detecting circuit 36 (FIGS. 3 and 5) because the inductor current $i_P$ alternatively flows through the primary windings 138A and 138B due to the alternating conduction of the FET 164 and the diode 168. As a consequence, a continuous DC voltage at the output 114 of the current-to-voltage conversion circuit 41 results. Again, equation (10) can be used for the determination of output current $I_{OUT}$. However, the winding ratio N1/N2 for the transformer 74 must be fixed to 1 because current flows directly through the primary winding 138A and 138B.

Furthermore, all the switches described in the embodiments involve the use of FETS. It certainly is feasible that other kinds of switches can be used, such as bipolar transistors, or IGBTs (Insulated Gate Bipolar Transistors). The current sensing circuit need not involve a current transformer as depicted. Other types of current sensing schemes are also possible, such as a sense circuit with a sense resistor or a Hall effect device. It will be understood by those skilled in the art that these and other changes in form and detail may be made therein without departing from the scope and spirit of the invention.

What is claimed is:

1. A switching-mode power converter comprising:
   first and second circuits;
   a transformer having first and second windings respectively coupled to said first and second circuits; and
   a detecting circuit having an input and an output, said first winding being coupled to said input of said detecting circuit;
   wherein during operation, when a first current passes through said first winding, said transformer inductively induces a second current passing through said second circuit via said second winding, said detecting circuit detects said first current and generates at said output an output signal which is proportional in magnitude to said second current passing through said second circuit.

2. The switching-mode power converter as set forth in claim 1 further including a sensing circuit disposed between said first winding and said input of said detecting circuit.

3. The switching-mode power converter as set forth in claim 2 wherein said transformer being a first transformer, said sensing circuit includes a second transformer having third and fourth windings, said third winding being coupled to said first winding of said first transformer, and said fourth winding being connected to said input of said detecting circuit.

4. The switching-mode power converter as set forth in claim 1 wherein said detecting circuit includes a current-to-voltage converter coupled to a sample-and-hold circuit, wherein said current-to-voltage converter converts said first current into a first voltage, said sample-and-hold circuit samples and holds said first voltage at predetermined time intervals thereby providing an output voltage level as said output signal which is proportional in magnitude to said second current passing through said second circuit.

5. The switching-mode power converter as set forth in claim 1 wherein said output signal bears a linear relationship with said second current.

6. The switching-mode power converter as set forth in claim 1 wherein said first circuit includes a single switch.

7. The switching-mode power converter as set forth in claim 1 wherein said first circuit includes a half-bridge switching circuit.

8. The switching-mode power converter as set forth in claim 1 wherein said first circuit includes a full-bridge switching circuit.

9. The switching-mode power converter as set forth in claim 1 wherein said first circuit includes a buck switching circuit.

10. A switching-mode power converter comprising:

first and second circuits;

a transformer having first and second windings respectively coupled to said first and second circuits;

a sensing circuit coupled to said first winding; and a detecting circuit having an input and an output, said sensing circuit being connected to said input of said detecting circuit;

wherein during operation, when a first current passes through said first winding, said transformer inductively induces a second current passing through said second circuit via said second winding, said sensing circuit senses said first current and activates said detecting circuit which responds with an output signal proportional in magnitude to said second current passing through said second circuit.

11. The switching-mode power converter as set forth in claim 10 wherein said detecting circuit further including a current-to-voltage converter coupled to a sample-and-hold circuit, wherein said current-to-voltage converter converts said first current sensed by said sensing circuit into a first voltage, said sample-and-hold circuit samples and holds said first voltage at predetermined intervals thereby providing said output signal having a voltage level proportional in magnitude to said second current passing through said second circuit.

12. The switching-mode power converter as set forth in claim 10 wherein said transformer being a first transformer, said sensing circuit includes a second transformer having third and forth windings, said third winding being coupled to said first winding of said first transformer, and said fourth winding being connected to said input of said detecting circuit.

13. The switching-mode power converter as set forth in claim 10 wherein said detecting circuit further including:

a first sample-and-hold circuit having an input coupled to the input of said detecting circuit;

a voltage divider, said first sample-and-hold circuit being disposed to drive said voltage divider;

a second sample-and-hold circuit having an input coupled to the input of said detecting circuit; and a comparator having first and second differential inputs, said first differential input being connected to said voltage divider, said second differential input being coupled to the input of said detecting circuit, said comparator being disposed to drive said second sample-and-hold circuit;

wherein during operation, said comparator compares signal levels at said first and second differential inputs and generates an output signal driving said second sample-and-hold circuit, thereby allowing said second sample-and-hold circuit to sample and hold electrical signals generated by said sensing circuit at predetermined time intervals, so as to provide said output signal having a voltage level proportional in magnitude to said second current passing through said second circuit.

14. The switching-mode power converter as set forth in claim 13 wherein said detecting circuit further including a bridge rectifier and a current-to-voltage converter, said bridge rectifier being disposed between said first circuit and said current-to-voltage converter.

15. The switching-mode power converter as set forth in claim 13 wherein said voltage divider includes two resistors having substantially equal resistive values.

16. The switching-mode power converter as set forth in claim 10 wherein said first circuit includes a half-bridge switching circuit.

17. The switching-mode power converter as set forth in claim 10 wherein said first circuit includes a full-bridge switching circuit.

18. The switching-mode power converter as set forth in claim 10 wherein said first circuit includes a buck switching circuit.

19. A switching-mode power converter comprising:

first and second circuits;

a first transformer having N1 winding turns inductively coupled to N2 winding turns, the ratio of said N1 winding turns to said N2 winding turns being a first coupling ratio of said first transformer;

a second transformer having N3 winding turns inductively coupled to N3 winding turns, the ratio of said N3 winding turns to said N4 winding turns being a second coupling ratio of said second transformer, said N1 winding turns of said first transformer being coupled to said N3 winding turns of said second transformer; and a detecting circuit having an input and an output, said N4 winding turns being connected to said input of said detecting circuit;

wherein during operation, when a first current passes through said N1 winding turns, said first transformer induces a second current passing through said second circuit via said N2 winding turns, said N1 winding turns of said first transformer being connected to said N3 winding turns of said second transformer, thereby allowing said first current passing through said N1 and N3 winding turns to induce a third current passing through said N4 winding turns, said detecting circuit detects said third current via said input and responds with an output signal at said output, said output signal being proportionally corresponds to the magnitude of said second current in accordance with the ratio: (N1/N2)×(N3/N4).

20. The switching-mode power converter as set forth in claim 19 further including a sensing circuit disposed between said first winding and said detecting circuit.

21. The switching-mode power converter as set forth in claim 19 wherein said detecting circuit further including:

a rectifying circuit;

a current-to-voltage converting circuit;

a first sample-and-hold circuit, said rectifying circuit being disposed between said current-to-voltage converting circuit and said first sample-and-hold circuit;

a voltage divider, said first sample-and-hold circuit being disposed to drive said voltage divider;

a second sample-and-hold circuit having an input coupled to the output of said current-to-voltage converting circuit; and a comparator having first and second differential inputs, said first differential input being connected to said voltage divider, said second differential input being coupled to the output of said current-to-voltage converting circuit, said comparator being disposed to control said second sample-and-hold circuit;

wherein during operation, said comparator compares signal levels at said first and second differential inputs and generates an output signal controlling said second sample-and-hold circuit, thereby allowing said second sample-and-hold circuit to sample and hold electrical signals generated by said sensing circuit at predetermined time intervals.

22. The switching-mode power converter as set forth in claims 21 wherein said voltage divider includes two resistors of substantially equal resistive values connected in series, the common connection of said two resistors being connected to said first differential input of said comparator.

* * * * *